(12) United States Patent
Takahashi et al.

(10) Patent No.: US 12,297,796 B2
(45) Date of Patent: May 13, 2025

(54) CONTROL METHOD FOR INTERNAL COMBUSTION ENGINE AND CONTROL DEVICE

(71) Applicant: NISSAN MOTOR CO., LTD., Yokohama (JP)

(72) Inventors: Sho Takahashi, Kanagawa (JP); Shuji Kojima, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/734,075

(22) Filed: Jun. 5, 2024

(65) Prior Publication Data

US 2024/0410330 A1    Dec. 12, 2024

(30) Foreign Application Priority Data

Jun. 6, 2023    (JP) ................................ 2023-092831

(51) Int. Cl.
| | |
|---|---|
| *F02P 5/152* | (2006.01) |
| *F02D 35/02* | (2006.01) |
| *F02D 41/14* | (2006.01) |

(52) U.S. Cl.
CPC ............ *F02P 5/152* (2013.01); *F02D 35/027* (2013.01); *F02D 41/1498* (2013.01)

(58) Field of Classification Search
CPC .... F02P 5/152; F02D 35/027; F02D 41/1498; G01L 23/22; G01L 23/221; G01M 15/12
See application file for complete search history.

(56) References Cited

U.S. PATENT DOCUMENTS

| | | | | |
|---|---|---|---|---|
| 3,393,557 | A * | 7/1968 | Brown | ................ G01L 23/225 73/35.03 |
| 4,455,862 | A * | 6/1984 | Takeuchi | ................ G01H 1/00 73/35.03 |
| 4,640,251 | A * | 2/1987 | Harada | ............. G01N 33/2817 123/492 |
| 4,753,201 | A * | 6/1988 | Fukuo | .................... F01M 11/02 123/196 R |
| 2006/0089236 | A1* | 4/2006 | Tamai | ............... B60W 30/1882 477/115 |

(Continued)

FOREIGN PATENT DOCUMENTS

JP    S62-247177 A    10/1987

*Primary Examiner* — John M Zaleskas
(74) *Attorney, Agent, or Firm* — Foley & Lardner LLP (57) ABSTRACT

When vibration sensed by knock sensor configured to sense the vibration of a multiple cylinder internal combustion engine is greater than a predetermined knock threshold value, a controller performs a first ignition timing control to retard ignition timings of cylinders so that the vibration becomes equal to or smaller than the knock threshold value; previously specifies a specific cylinder relating to a specific vibration due to a bending of a crank shaft; and in a state in which a driving state is in a predetermined specific driving region where there is a possibility that the specific vibration will be generated, when the vibration of the specific cylinder is greater than a predetermined specific vibration judgment threshold value that is smaller than the knock threshold value, performs a second ignition timing control to retard only the ignition timing of the specific cylinder by a predetermined amount.

5 Claims, 5 Drawing Sheets

(56) References Cited

U.S. PATENT DOCUMENTS

| | | | |
|---|---|---|---|
| 2007/0289575 A1* | 12/2007 | Yoshihara | F02P 5/152 123/406.29 |
| 2008/0257018 A1* | 10/2008 | Inada | G01L 23/225 73/35.08 |
| 2012/0192835 A1* | 8/2012 | Matsushima | F02D 35/027 123/436 |
| 2012/0266844 A1* | 10/2012 | Hagari | F02D 41/22 123/406.38 |
| 2012/0296558 A1* | 11/2012 | Ono | F02P 5/152 701/111 |
| 2013/0151127 A1* | 6/2013 | Saito | F02D 35/027 701/111 |
| 2013/0151128 A1* | 6/2013 | Ono | F02P 5/152 701/111 |
| 2014/0102403 A1* | 4/2014 | Yoshihara | F02M 25/0227 123/25 A |
| 2014/0350823 A1* | 11/2014 | Glugla | F02D 41/0087 701/104 |
| 2015/0226144 A1* | 8/2015 | Sixel | F02D 35/023 123/90.15 |
| 2016/0003173 A1* | 1/2016 | Okada | G01M 15/12 73/35.09 |
| 2016/0265454 A1* | 9/2016 | Bizub | F02D 35/02 |
| 2017/0051688 A1* | 2/2017 | Glugla | F02D 41/0087 |
| 2017/0101944 A1* | 4/2017 | Umeno | G06F 17/18 |
| 2019/0017487 A1* | 1/2019 | Rudnitzki | F02D 41/009 |
| 2019/0195150 A1* | 6/2019 | Kluth | F02D 35/027 |
| 2020/0064227 A1* | 2/2020 | Im | F02D 35/027 |
| 2020/0072139 A1* | 3/2020 | Kiwan | F02D 35/027 |
| 2020/0080502 A1* | 3/2020 | Glugla | F02D 35/027 |
| 2020/0277927 A1* | 9/2020 | Frank | G01L 23/221 |
| 2022/0195957 A1* | 6/2022 | Lee | G01L 23/221 |

* cited by examiner

CONTROL METHOD FOR INTERNAL COMBUSTION ENGINE AND CONTROL DEVICE

BACKGROUND

The present invention relates to a control method for an internal combustion engine and a control device for the internal combustion engine.

Japanese Patent Application Publication No. S62-247177 discloses an art configured to perform a retard control of an ignition timing for each cylinder in accordance with a knocking sensed by a knock sensor of an internal combustion engine so as to suppress the knocking by a preignition.

SUMMARY

However, in the internal combustion engine, a main motion system receives a combustion pressure at a driving, so that a vibration may be generated due to bending of a crank shaft.

That is, the vibration generated in the internal combustion engine is due to the preignition, or the bending of the crank shaft at the driving.

Accordingly, there is room for improvement in suppression of the generation of the vibration due to the bending of the crank shaft.

According to one aspect of the present invention, a control method of an internal combustion engine comprises: when a vibration sensed by a knock sensor configured to sense the vibration of a multiple cylinder internal combustion engine is greater than a predetermined knock threshold value, performing a first ignition timing control to retard ignition timings of cylinders so that the vibration sensed by the knock sensor becomes equal to or smaller than the knock threshold value; previously specifying a specific cylinder relating to a specific vibration due to a bending of a crank shaft; and in a state in which a driving state is in a predetermined specific driving region where there is a possibility that the specific vibration will be generated, by using a predetermined specific vibration judgment threshold value that is smaller than the knock threshold value, when the vibration of the specific cylinder sensed by the knock sensor is greater than the specific vibration judgment threshold value, performing a second ignition timing control to retard only the ignition timing of the specific cylinder by a predetermined amount.

According to another aspect of the invention, a control device of an internal combustion engine comprises: a knock sensor configured to sense a vibration of a multiple cylinder internal combustion engine; and a controller configured to be able to individually control an ignition timing of each cylinder, wherein the controller is configured to previously specify a specific cylinder relating to a specific vibration due to a bending of a crank shaft, the controller is configured to be able to perform a first ignition timing control to retard the ignition timing of each cylinder so that the vibration sensed by the knock sensor becomes equal to or smaller than a predetermined knock threshold value, and a second ignition timing control to retard only the ignition timing of the specific cylinder relating to the specific vibration due to the bending of the crank shaft by using a predetermined specific vibration judgment threshold value that is smaller than the knock threshold value, the first ignition timing control is performed when the vibration sensed by the knock sensor is greater than the knock threshold value, and in a state in which a driving state is in a predetermined specific driving region where there is a possibility that the specific vibration will be generated, the second ignition timing control is performed when the vibration of the specific cylinder sensed by the knock sensor is greater than the specific vibration judgment threshold value.

In the internal combustion engine according to the present invention, the ignition timing of the specific cylinder is retarded without retarding the ignition timings of the all cylinders. With this, it is possible to suppress the generation of the specific vibration while suppressing the reduction of the output performance of the internal combustion engine.

DETAILED DESCRIPTION

Hereinafter, one example according to the present invention is described in detail with reference to the drawings.

Figure 1:
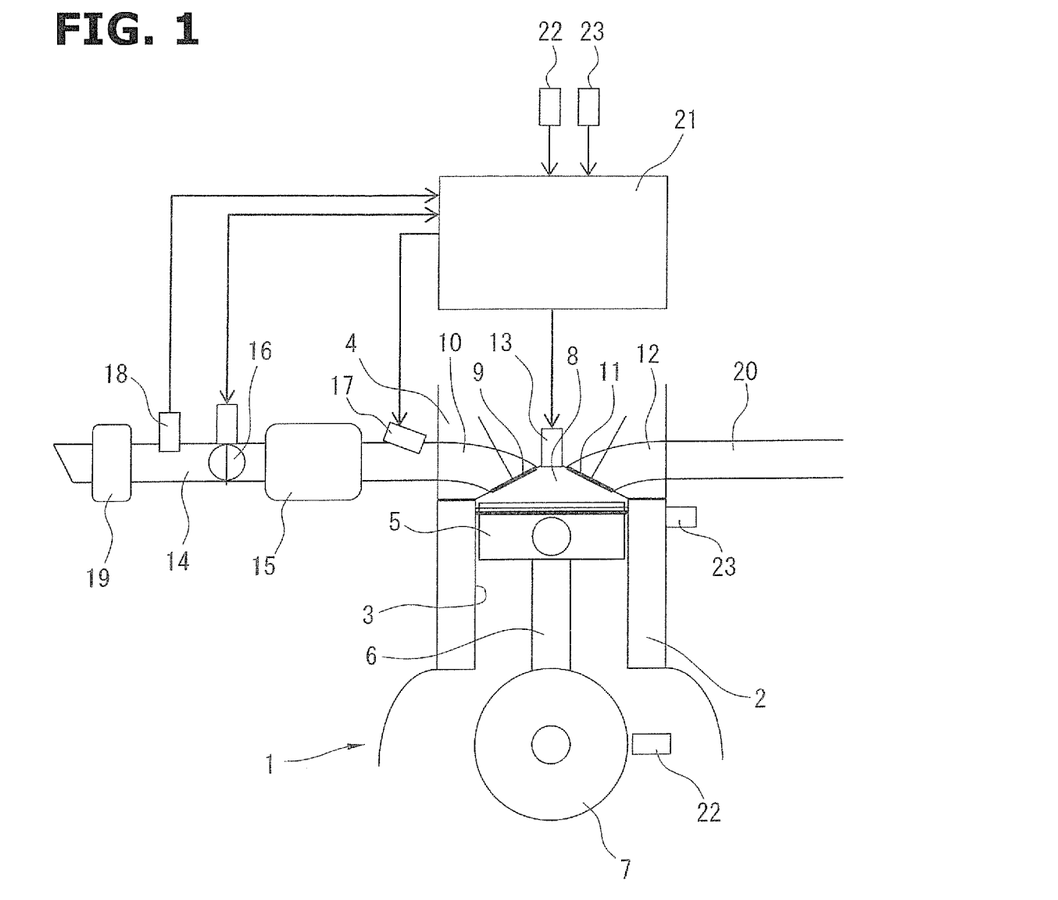
FIG. 1 is an explanation view schematically showing a system configuration of an internal combustion engine to which the present invention is applied.

FIG. 1 is an explanation view schematically showing a system configuration of a spark ignition type internal combustion engine 1 of a port injection type to which the present invention is applied. A multiple cylinder internal combustion engine 1 includes a cylinder block 2 including a plurality of cylinders (bores) 3; and a cylinder head 4 fixed on an upper side of the cylinder block 2. Here, FIG. 1 shows only one cylinder 3 of the cylinders of the internal combustion engine 1. Actually, the internal combustion engine 1 includes a plurality of cylinders 3 aligned in a cylinder row direction.

A piston 5 is slidably disposed in each of the cylinders 3. Each of the pistons 5 is connected through a connecting rod 6 to a crank shaft 7 of the internal combustion engine 1.

A combustion chamber 8 is formed above each of the pistons 5 between a lower surface of the cylinder head 4 and the each piston 5. Each of the combustion chambers 8 is connected through an intake valve 9 to an intake port 10. Moreover, each of the combustion chambers 8 is connected through an exhaust valve 11 to an exhaust port 12. A spark plug 13 is disposed within each of the combustion chambers 8. Each of the spark plugs 13 is configured to ignite an air fuel mixture.

A throttle valve 16 and a fuel injection valve 17 are provided to the intake passage 14 connected to the intake port 10 of each cylinder. The throttle valve 16 and the fuel injection valve 17 are provided on an upstream side of a suction collector 15. Each of the throttle valves 16 is an electronically controlled type. Each of the throttle valves 16 is configured to adjust an intake amount (intake air amount). Each of the fuel injection valves 17 is configured to inject the fuel to the intake port 19 of the each cylinder. Here, the present invention is applicable to a cylinder direct injection type internal combustion engine configured to directly inject the fuel into the combustion chamber, in addition to the above-described port injection type internal combustion engine. Moreover, an air flow meter 18 and an air cleaner 19 are provided on the upstream side of the throttle valve 16. The air flow meter 18 is configured to sense the intake amount. The air cleaner 19 is configured to catch foreign objects in the intake air.

An exhaust passage 20 is connected to the exhaust port 12 of the each cylinder.

A control unit 21 that is a control section (a controller) is a known digital computer including a CPU, a ROM, a RAM, and an input/output interface. The control unit 21 is configured to receive detection signals of various sensors of a crank angle sensor 22, a knock sensor 23, and so on, in addition to the above-described air flow meter.

The crank angle sensor 22 is configured to sense a crank angle of the crank shaft 7, and to sense an engine speed of the internal combustion engine 1.

The knock sensor 23 is configured to sense the vibration of the internal combustion engine 1. The knock sensor 23 is mounted to the cylinder block 2.

The control unit 21 is configured to output control signals to the throttle valve 16, the spark plug 13, the fuel injection valve 17, and so on based on the detection signals of the various sensors, and to control the actuations of the throttle valve 16, the spark plug 13, the fuel injection valve 17, and so on.

The control unit 21 is configured to determine that the knocking is generated when the vibration (the sensor output) sensed by the knocking sensor 23 is equal to or greater than a predetermined knock threshold value, and to perform a first ignition timing control to retard the ignition timing of the each cylinder so that the vibration sensed by the knocking sensor 23 becomes equal to or smaller than the knock threshold value. The knock threshold value is set for sensing the knocking by the abnormal combustion of the internal combustion engine 1.

More specifically, the control unit 21 is determines the generation of the knocking, for example, when the signal strength (magnitude) of the knocking vibration frequency component extracted from the output signal of the knocking sensor 23 exceeds a first threshold value corresponding to the knock threshold value. In this way, when the generation of the knocking is sensed, the retard of the ignition timing is performed so as to suppress or solve this generation of the knocking.

Further, in the internal combustion engine 1, there is a possibility that, due to the fact that a main motion system receives the combustion pressure from a specific cylinder during the driving then the crank shaft 7 bends, the specific vibration (hammering noise) will be generated. The specific vibration is generated due to the bending of the crank shaft 7 and collision (interference) of the crank shaft 7 and the cylinder block 2 in a thrust direction.

Figure 2:
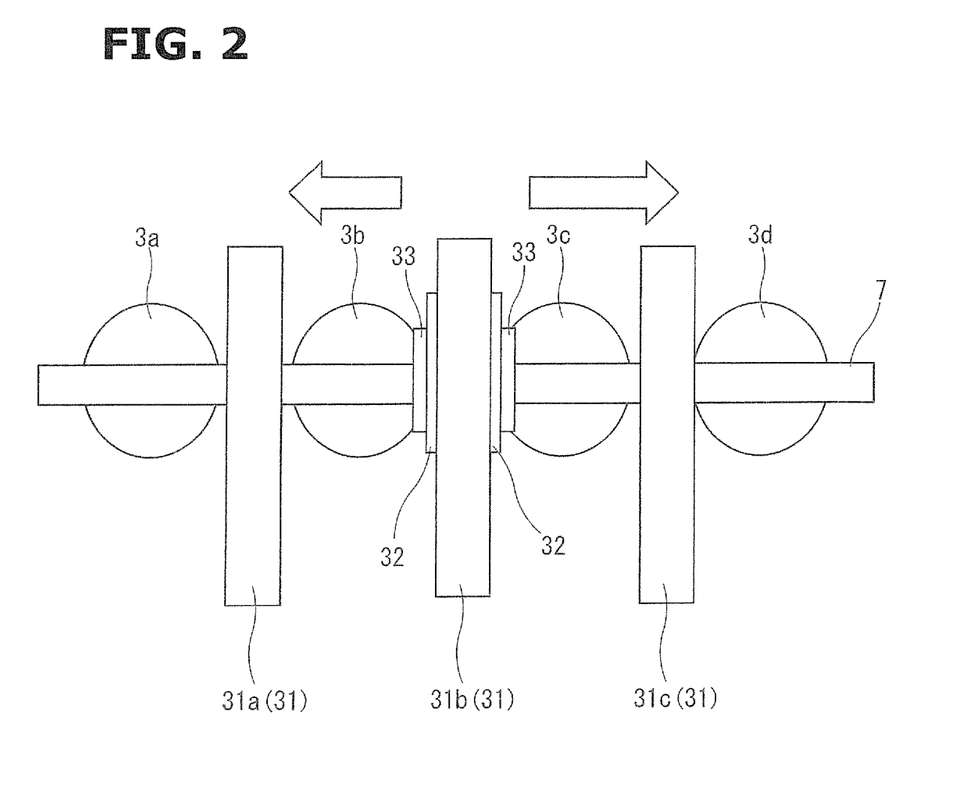
FIG. 2 is an explanation view schematically showing a crank shaft and members around the crank shaft.

FIG. 2 is an explanation view schematically showing the crank shaft 7, and the members around the crank shaft 7. In FIG. 2, #1 cylinder 3*a*, #2 cylinder 3*b*, #3 cylinder 3*c*, and #4 cylinder 3*d* are shown from a left side in FIG. 2.

The crank shaft 7 penetrates through a plurality of partition walls 31 of the cylinder block 2 which are formed to partition the cylinders. In FIG. 2, a partition wall 31*a* partitions #1 cylinder and #2 cylinder. A partition wall 312 partitions #2 cylinder and #3 cylinder. A partition wall 31*c* partitioning #3 cylinder and #4 cylinder are shown from the left side of FIG. 2.

Thrust washers 32 are mounted to the crank shaft 7 on both sides of the partition wall 31*b* positioned between #2 cylinder and #3 cylinder so as to restrict the movement of the crank shaft 7 along a cylinder row direction.

In the internal combustion engine 1, when the crank shaft 7 bends by receiving the combustion pressure from #2 cylinder or #3 cylinder and is deformed (varies) in the cylinder row direction as shown by arrows in FIG. 2, the counter weights 33 of the crank shaft 7 may collide with the thrust washers 32 and the specific vibration may be generated. That is, the vibration source of this specific vibration is the partition wall 31*b* to which the thrust washer 32 is mounted. Accordingly, in the internal combustion engine 1 in which the thrust washers 32 are disposed as shown in FIG. 2, the specific cylinder relating to the specific vibration is #2 cylinder and #3 cylinder which are positioned on both sides of the partition wall 31*b*.

Therefore, in the internal combustion engine 1 according to the present invention, in the vicinity of the thrust washer 32, the bending of the crank shaft 7 is suppressed, and the generation of the specific vibration is suppressed.

More specifically, in the internal combustion engine 1, when the specific vibration is generated, only the ignition timing of the specific cylinder is retarded to decrease the combustion pressure of the specific cylinder, then the bending of the crank shaft 7 is suppressed. Further, the deformation (the varying) of the crank shaft 7 along the cylinder row direction is suppressed, then the collision of the thrust washers 32 with respect to the partition wall 31*b* is suppressed. That is, it is possible to improve (suppress) the specific vibration by suppressing the combustion pressure.

In the internal combustion engine 1, since the generation cause of the specific vibration is limited to the specific cylinder, when the specific vibration is generated, it is possible to address the specific vibration by adjusting or controlling (suppressing) only the combustion pressure of the specific cylinder. That is, in the internal combustion engine 1, it is possible to suppress the specific vibration without lowering the output performance (the combustion pressure) in the all cylinders.

In a case in which the driving state is in a predetermined specific driving region, which is previously set, where there is a possibility that the specific vibration will be generated, when the knock sensor 23 senses the vibration exceeding a specific vibration judgment threshold value that is different from the knock threshold value at the specific cylinder, the control unit 21 performs a second ignition timing control to retard the ignition timing of the specific cylinder from the current ignition timing which is a reference ignition timing determined in accordance with the driving state by a predetermined amount.

More specifically, the control unit 21 determines the generation of the specific vibration, for example, when the signal strength (magnitude) of the frequency component of the specific vibration extracted from the output signal of the knock sensor 23 exceeds a second threshold value corresponding to a specific vibration judgment threshold value in the specific cylinder. As a method of judging the generation of the specific vibration by comparing the magnitude of the vibration frequency component of the specific vibration and the threshold value, it may be judged by comparing the magnitude of the vibration frequency component in itself of the specific vibration and the threshold value.

Figure 3:
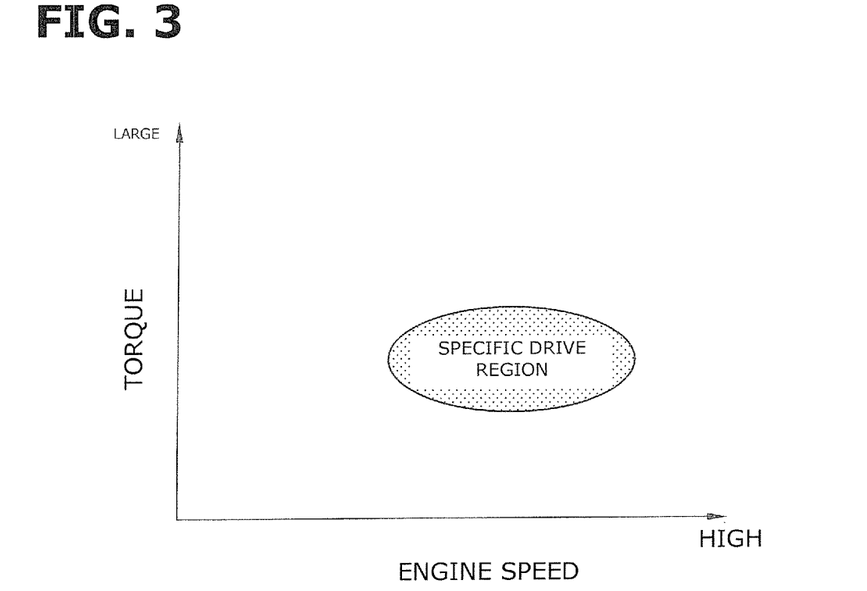
FIG. 3 is an explanation view schematically showing a specific driving region of the internal combustion engine.

As shown in FIG. 3, the specific driving region is a predetermined driving region of a predetermined middle rotation and a predetermined middle load. For example, the specific driving region is set based on adaptation etc. in each internal combustion engine. FIG. 3 is an explanation view schematically showing the specific driving region of the internal combustion engine 1. For example, the specific driving region is determined in accordance with the rigidity (stiffness) of the crank shaft 7, the pressure inputted to the cylinder 3, the area of the piston 5, and so on. The specific vibration judgment threshold value is set for sensing the specific vibration of the internal combustion engine 1. The specific vibration judgment threshold value is smaller than the knock threshold value.

The sensor output of the knock sensor 23 corresponding to the specific cylinder can be judged from the crank angle of the crank shaft 7 which is sensed by the crank angle sensor 22. In other words, the combustion timing of the specific cylinder can be judged by using the crank angle of the crank shaft 7.

Figure 4:
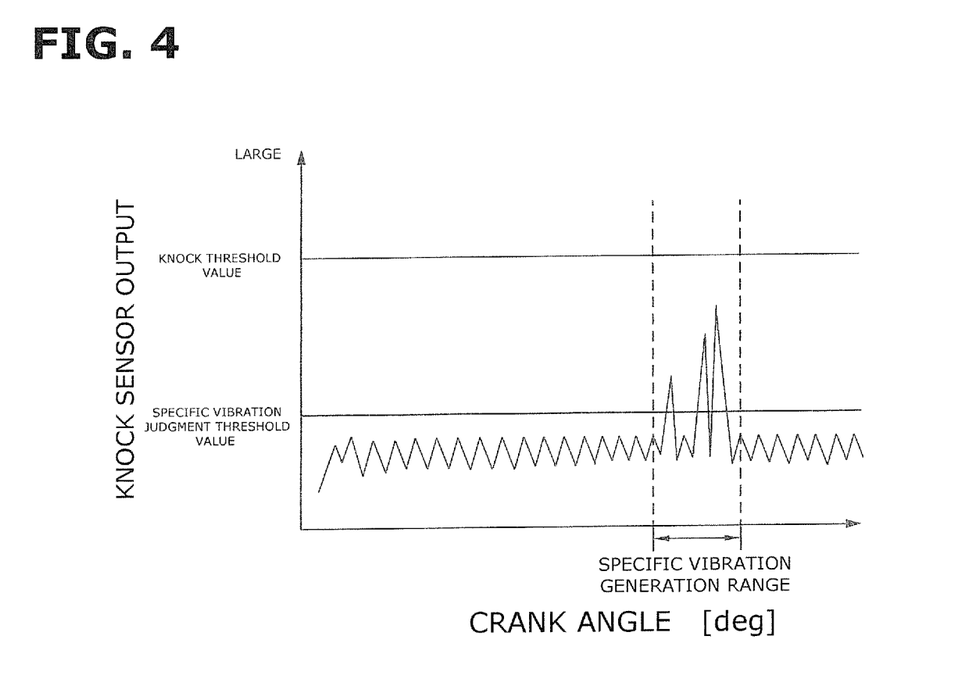
FIG. 4 is an explanation view showing a sensor output of a knock sensor and a crank angle at that time.

The specific vibration is sensed in a crank angle range (specific vibration generation range) corresponding to an expansion stroke (combustion stroke) of the specific cylinder. Accordingly, in the internal combustion engine 1, in a case in which the driving state is in the specific driving region and also the crank angle is within the specific vibration generation range as shown in FIG. 4, when the sensor output of the knock sensor 23 exceeds the specific vibration judgment threshold value, the specific vibration may be generated. FIG. 4 is an explanation view showing the sensor output of the knock sensor 23 and the crank angle at that time.

When the above-described specific vibration may be generated, the control unit 21 performs the second ignition timing control to retard the only ignition timing of the specific cylinder by a predetermined amount.

Figure 5:
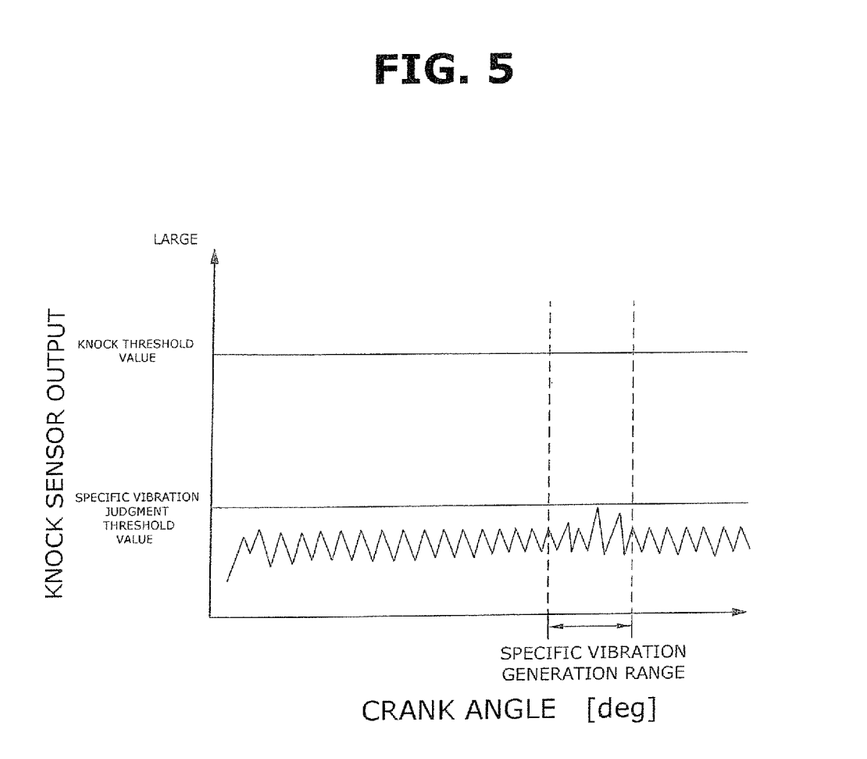
FIG. 5 is an explanation view showing a sensor output of a knock sensor and a crank angle at that time.

Then, when the sensor output of the knock sensor 23 became small (was improved) in the specific vibration generation range of the crank angle as shown in FIG. 5 as a result of execution of the second ignition timing control, the control unit 21 judges that the output sensor of the knock sensor 23 which is the trigger of execution of the second ignition timing control is due to the specific vibration. FIG. 5 is an explanation view showing the sensor output of the knock sensor 23 and the crank angle at that time.

The knock sensor 23 may mistakenly sense the vibration other than the specific cylinder as the specific vibration of the specific cylinder. However, when the vibration within the specific vibration generation range, which is sensed by the knock sensor 23, becomes smaller by the second ignition timing control, it can be judged that the specific vibration due to the specific cylinder in which the ignition timing is retarded is suppressed.

With this, in the internal combustion engine 1, by retarding the ignition timing of the specific cylinder without retarding the ignition timings of the all cylinders, it is possible to suppress the generation of the specific vibration due to the bending of the crank shaft 7 while suppress the deterioration of the output performance of the internal combustion engine 1.

When the sensor output of the knock sensor 23 became small (was improved) in the specific vibration generation range of the crank angle as a result of execution of the second ignition timing control, the control unit 21 performs a third ignition control. In the third ignition timing control, the only ignition timing of the specific cylinder is retarded until the sensor output of the knock sensor 23 becomes equal to or smaller than the specific vibration judgment threshold value in the specific vibration generation range of the crank angle.

When the sensor output of the knock sensor 23 did not become small (was not improved) in the specific vibration generation range of the crank angle as a result of execution of the second ignition timing control, the control unit 21 judges that the output sensor of the knock sensor 23 which is the trigger of execution of the second ignition timing control is not due to the specific vibration, but due to the vibration other than the specific cylinder.

When the sensor output of the knock sensor 23 did not become small (was not improved) in the specific vibration generation range of the crank angle as a result of execution of the second ignition timing control, the control unit 21 performs a fourth ignition timing control to advance the ignition timing of the specific cylinder by the predetermined amount to return the ignition timing of the specific cylinder to the ignition timing before the start of the second ignition timing control. That is, in the fourth ignition timing control, the ignition timing of the specific cylinder which is retarded by the second ignition timing control is returned to the ignition timing immediately before the execution of the second ignition timing control.

Figure 6:
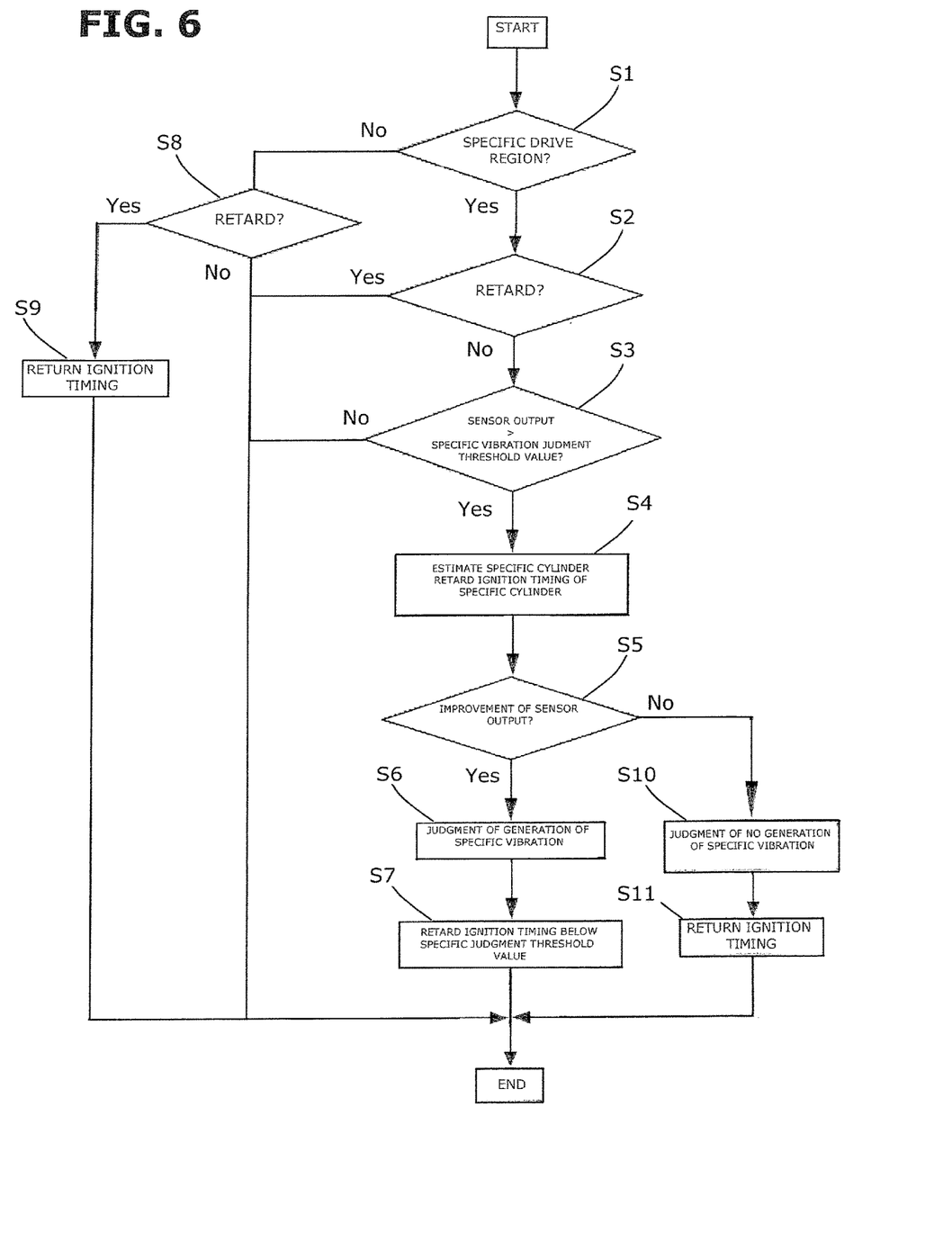
FIG. 6 is a flow chart showing one example of a flow of a control of the internal combustion engine to which the present invention is applied.

FIG. 6 is a flowchart showing one example of a flow of the control of the internal combustion engine 1 in the above-described embodiment.

At step S1, it is judged whether or not the driving region is the specific driving region. At step S1, when it is judged that the driving region is the specific driving region, the process proceeds to step S2. At step S1, when it is judged that the driving region is not the specific driving region, the process proceeds to step S8.

At step S2, it is judged whether the ignition timing of the specific cylinder is already retarded. At step S2, it is judged that the ignition timing of the specific cylinder is already retarded, the present routine is finished. At step S2, it is judged that the ignition timing of the specific cylinder is not retarded, the process proceeds to step S3.

At step S3, it is judged whether or not the sensor output of the knock sensor 23 is greater than the specific vibration judgment threshold value. At step S3, it is judged that the sensor output of the knock sensor 23 is greater than the specific vibration judgment threshold value, the process proceeds to step S4. At step S3, it is judged that the sensor output of the knock sensor 23 is equal to or smaller than the specific vibration judgment threshold value, the present routine is finished.

At step S4, the specific cylinder in which the specific vibration is generated is estimated (presumed). The ignition timing of the estimated specific cylinder is retarded by a predetermined amount.

At step S5, it is judged whether or not the sensor output of the knock sensor 23 is improved. At step S5, it is judged that the sensor output of the knock sensor 36 within the specific vibration generation range of the crank angle became small (was improved), the process proceeds to step S6. At step S5, it is judged that the sensor output of the knock sensor 36 within the specific vibration generation range of the crank angle did not become small (was not improved), the process proceeds to step S10.

At step S6, it is judged that the specific vibration is generated.

At step S7, the ignition timing of the specific cylinder is retarded until the sensor output of the knock sensor 36 within the specific vibration range becomes equal to or smaller than the specific vibration judgment threshold value.

At step S8, it is judged whether or not the ignition timing of the specific cylinder is already retarded. At step S8, it is judged that the ignition timing of the specific cylinder is already retarded, the process proceeds to step S9. At step S8, it is judged that the ignition timing of the specific cylinder is not retarded, the present routine is finished.

At step S10, it is judged that the specific vibration is not generated.

At step S11, the retarded ignition timing of the specific cylinder is returned to the original ignition timing. That is, at step S11, the ignition timing of the specific cylinder is returned to the normal ignition timing determined in accordance with the driving state.

Hereinabove, the concrete embodiment according to the present invention is described. However, the present invention is not limited to the above-described embodiment. Various modification are applicable as long as it is not deviated from the gist of the present invention.

For example, the retard amount of the ignition timing in the second ignition timing control may be set to be proportional to the magnitude of the vibration sensed by the knock sensor 23. That is, the retard amount of the ignition timing in the second ignition timing control may be set to be greater as the sensor output of the knock sensor 23 becomes greater.

The entire contents of Japanese Patent Application No. 2023-92831 filed Jun. 6, 2023 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A control method of a multiple cylinder internal combustion engine, the control method comprising:
   in response to a vibration sensed by a knock sensor configured to sense the vibration of the multiple cylinder internal combustion engine being greater than a predetermined knock threshold value, performing a first ignition timing control to retard ignition timings of cylinders so that the vibration sensed by the knock sensor becomes equal to or smaller than the predetermined knock threshold value;
   specifying a specific cylinder relating to a specific vibration due to bending of a crank shaft; and
   in response to a driving state being in a predetermined specific driving region where there is a possibility of generating the specific vibration, by using a predetermined specific vibration judgment threshold value that is smaller than the predetermined knock threshold value, responsive to the vibration of the specific cylinder sensed by the knock sensor being greater than the predetermined specific vibration judgment threshold value, performing a second ignition timing control to retard only the ignition timing of the specific cylinder by a predetermined amount.

2. The control method of the multiple cylinder internal combustion engine as claimed in claim 1, further comprising:
   in response to the vibration sensed by the knock sensor decreasing by execution of the second ignition timing control, performing a third ignition timing control to retard only the ignition timing of the specific cylinder until the vibration sensed by the knock sensor becomes equal to or smaller than the predetermined specific vibration judgment threshold value.

3. The control method of the multiple cylinder internal combustion engine as claimed in claim 1, further comprising:
   in response to the vibration sensed by the knock sensor not decreasing by execution of the second ignition timing control, performing a fourth ignition timing control to advance the ignition timing of the specific cylinder by the predetermined amount and to return the ignition timing of the specific cylinder to an ignition timing before the start of the second ignition timing control.

4. The control method of the multiple cylinder internal combustion engine as claimed in claim 1, wherein
   the retard amount of the ignition timing of the second ignition timing control is set in proportion to a magnitude of the vibration sensed by the knock sensor.

5. A control device of a multiple cylinder internal combustion engine comprising:
   a knock sensor configured to sense a vibration of the multiple cylinder internal combustion engine; and
   a controller configured to individually control ignition timing of each cylinder, wherein
   the controller is configured to
      specify a specific cylinder relating to a specific vibration due to bending of a crank shaft, and
      perform a first ignition timing control to retard the ignition timing of each cylinder so that the vibration sensed by the knock sensor becomes equal to or smaller than a predetermined knock threshold value, and a second ignition timing control to retard only the ignition timing of the specific cylinder relating to the specific vibration due to the bending of the crank shaft by using a predetermined specific vibration judgment threshold value that is smaller than the predetermined knock threshold value,
   the first ignition timing control is performed in response to the vibration sensed by the knock sensor being greater than the predetermined knock threshold value, and
   in response to a driving state being in a predetermined specific driving region where there is a possibility of generating the specific vibration, the second ignition timing control is performed responsive to the vibration of the specific cylinder sensed by the knock sensor being greater than the predetermined specific vibration judgment threshold value.

* * * * *